United States Patent

Candy et al.

[15] 3,670,096

[45] June 13, 1972

[54] REDUNDANCY REDUCTION VIDEO ENCODING WITH CROPPING OF PICTURE EDGES

[72] Inventors: James Charles Candy, Convent Station; Gladys Marie Franke, Matawan; Frank William Mounts, Colts Neck, all of N.J.

[73] Assignee: Bell Telephone Laboratories, Incorporated, Murray Hill, Berkeley Heights, N.J.

[22] Filed: June 15, 1970

[21] Appl. No.: 46,292

[52] U.S. Cl. ............................................178/6, 178/DIG. 3

[51] Int. Cl. ........................................................H04n 7/12

[58] Field of Search ...................178/6, 6.8, DIG. 3, 15.55 R, 178/7.1 R, 7.2 R

[56] References Cited

UNITED STATES PATENTS

| | | | |
|---|---|---|---|
| 3,061,672 | 10/1962 | Wylie | 178/7.1 |
| 3,299,204 | 1/1967 | Cherry et al. | 178/DIG. 3 |
| 3,324,237 | 6/1967 | Cherry et al. | 178/6 |
| 3,472,953 | 10/1969 | Montevecchio | 178/6.8 |
| 3,499,975 | 3/1970 | Arps | 178/6.8 |

*Primary Examiner*—Robert L. Griffin
*Assistant Examiner*—John C. Martin
*Attorney*—R. J. Guenther and E. W. Adams, Jr.

[57] ABSTRACT

In a conditional replenishment video system a coder selects only those samples from an input video signal which represent a significant change in amplitude for their corresponding spatial points within the video frame. A buffer memory in the coder stores the selected samples prior to their being transmitted to a receiving location. In response to an overload signal from the buffer memory, all selection by the coder is stopped for an interval at least as long as one video frame, and a special code word is coupled into the buffer memory. In a plurality of video frames following the cessation of all selecting, only those samples from the center area of the video frame are processed by the coder for transmission to a receiving location. Upon receiving the special code word, the receiver apparatus establishes a constant video amplitude at the edges of the picture outside of the center area. After the above-mentioned plurality of video frames has elapsed, the number of samples processed in each video frame is increased at a rate of one line of picture elements per frame along each edge of the center area of the picture until the entire video frame of samples is again processed by the coder. Visual indication that only the center area of the picture is being processed is given to the party in a visual-telephone system whose activity is causing a cropping of the picture either by means of a display device such as a pilot light or by means of a novel circuit in which the video picture which he sees of the other party is cropped by substantially the same amount as the picture which he is transmitting.

17 Claims, 7 Drawing Figures

INVENTORS
J. C. CANDY
G. M. FRANKE
F. W. MOUNTS
BY David H. Dubosky
ATTORNEY

RECEIVER BLANKING CIRCUIT

TRANSMITTER BLANKING CONTROL

REDUNDANCY REDUCTION VIDEO ENCODING WITH CROPPING OF PICTURE EDGES

BACKGROUND OF THE INVENTION

This invention relates to redundancy reduction video systems. In these systems, samples are taken of an input signal at a constant rate and these samples are then processed by an encoder which selects the samples which must be transmitted to the receiving location in order to provide that location with the information content of the input signal.

One such redundancy reduction system now known in the video art is called a conditional replenishment video system. In this latter system only the samples of picture element amplitudes that have changed significantly from one video frame to the next are selected for transmission to the receiving location. The number of samples which are selected during any video frame interval depends on the number of changes which have occurred in the scene being viewed. Since the samples which are selected are almost never uniformly distributed within the video frame, the rate at which samples are selected is irregular. To interface the selected samples with a digital transmitter operating at a constant bit rate, the encoder is provided with a buffer memory at its output. During periods of increased activity in the scene being viewed, this buffer memory tends to fill toward its maximum capacity.

If the buffer memory is not made large enough to accommodate the number of samples which are selected during the periods of increased activity, samples that are selected after the buffer memory has been filled to its maximum capacity have no place to be stored and, therefore, the information present in these samples is lost. As a result, the picture being viewed at the receiving location will contain both samples that have been updated during the period of activity and samples which have existed from before the period of activity commenced. This picture will be severely distorted in that elements of the picture will appear to be broken and displaced.

If the buffer memory is made large enough to accommodate all of the selected samples during a period of increased activity, this large buffer memory, in addition to being expensive, introduces a large amount of delay in the video signal between the transmitting and receiving locations. This delay is undesirable, particularly in a video telephone service where very little delay should occur in the information transmitted.

SUMMARY OF THE INVENTION

A primary object of the present invention is to reduce the size of the buffer memory that is required to be used in conjunction with a redundancy reduction video system without introducing distortions in the scene being viewed during intervals of increased activity. This object and others are achieved in accordance with the present invention wherein the buffer memory at the output of a conditional replenishment video system provides an overload signal to indicate that it has been filled to its maximum capacity. In response to this overload signal, all encoding is caused to stop for an interval equal to approximately one video frame time. During this interval, the buffer memory is permitted to retreat from its overload condition. After this initial brief interval, encoding is permitted to take place only within the center area of the picture for a predetermined interval equal in duration to a plurality of video frame intervals. In the receiver, the picture elements outside the center area are presented as a constant video amplitude, thereby cropping the picture and giving the appearance of a frame around the encoded center area of the picture. After the predetermined interval, the framing or cropping is removed at the rate of one line of picture elements per frame on each edge of the picture.

A feature of the present invention is that the predetermined interval can be shortened by an indication from the buffer memory that the number of words stored in the buffer memory has dropped to a predetermined number. In this way the blanking or cropping is removed in an interval shorter than the predetermined interval by an indication from the buffer memory that it may no longer be necessary.

In accordance with one aspect of the present invention, an indicator device such as a light is provided at the transmitting terminal in order to inform a party that his activity has caused a cropping of the picture. He may then choose to either position himself within the center of the field of view or to reduce his activity so as to restore a picture in the entire area of the video frame.

In accordance with a second aspect of the present invention, the means by which the active party is informed that his activity has caused a cropping of the other party's picture utilizes the picture which the active party is viewing. In accordance with this aspect of the invention, the signal which causes the active party's encoder to operate only upon the center area of the video frame is also utilized to blank the edges of the picture which he is observing on his receiving display apparatus. This blanked area is removed at the same rate at which the framing is removed in the other location. As a result, the party whose activity is causing the picture cropping is constantly aware of the reduction in viewing area being caused by his activity.

BRIEF DESCRIPTION OF THE DRAWINGS

The invention will be more readily understood after reading the following detailed description taken in conjunction with the drawings in which.

DETAILED DESCRIPTION

Figure 1:
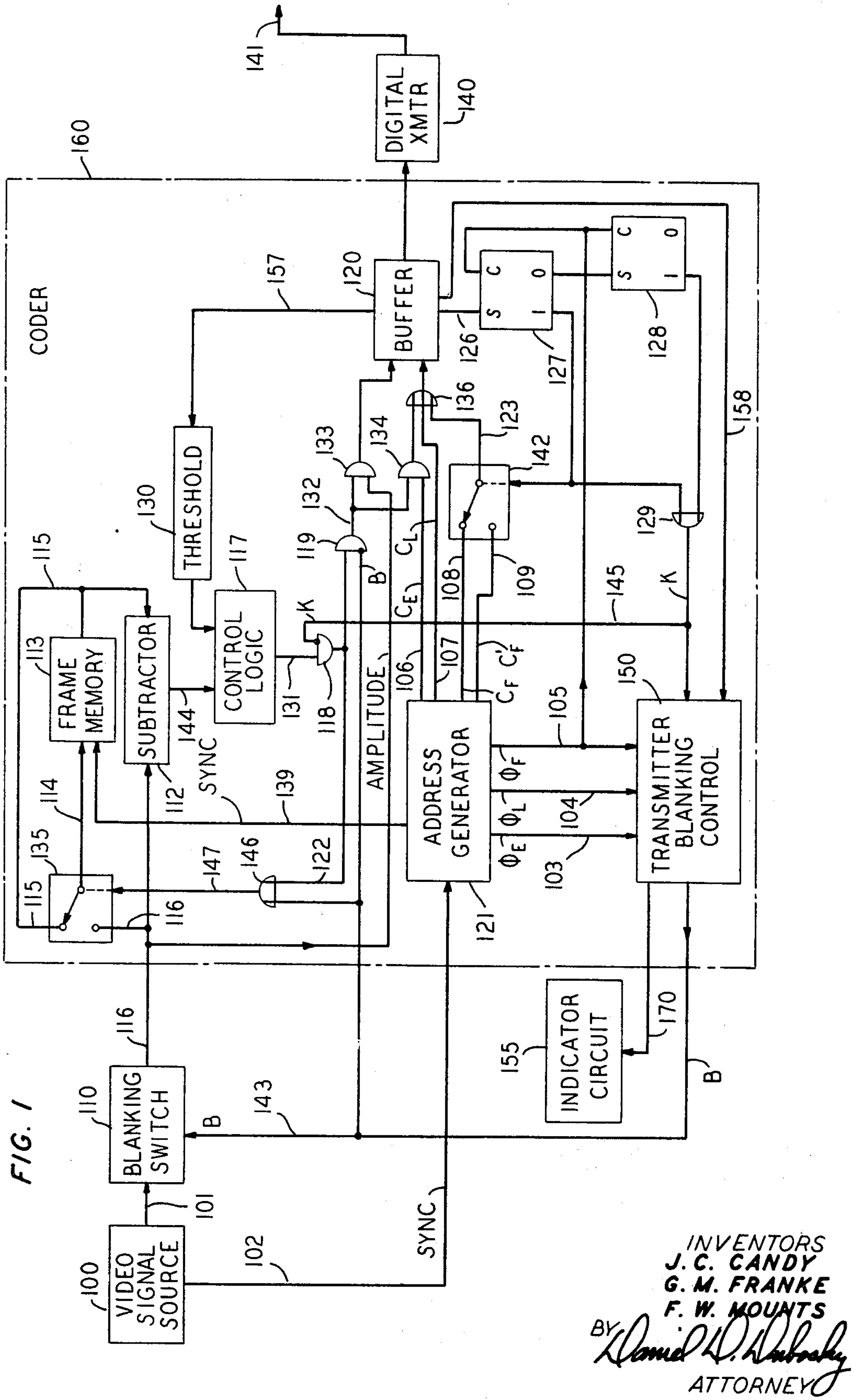
FIG. 1 is a schematic block diagram of a transmitting terminal constructed in accordance with the present invention.

In FIG. 1, video signal source 100 provides amplitude values on transmission line 101 of samples taken of a video signal within video source 100. The video signal is of the well-known type having frame intervals separated by vertical blanking intervals and line subintervals separated by horizontal blanking intervals. The amplitude values on line 101 are provided in the form of a serial bit stream, that is, the amplitude value of each sample is indicated by a digital word whose digital bits are serially provided on transmission line 101. Part or all of video signal source 100 may be physically located at a point which is remote from the location of the remainder of the apparatus shown in FIG. 1. For example, it may consist of a video-telephone set in a subscriber's home followed by a sampling circuit and an analog-to-digital converter in a central office.

A synchronization link is established by way of line 102 between the video signal in source 100 and an address generator 121. For each video sample whose amplitude is provided in digital form on line 101, address generator 121 generates an energizing pulse on line 103 and, in addition, generates a digital word on line 106. The value of the digital word generated on line 106 indicates the location of its corresponding amplitude sample within the video line, and this digital word is therefore referred to hereinafter as the address word of the amplitude sample which is simultaneously presented on line 101.

During the horizontal blanking interval of the video signal, address generator 121 generates an energizing pulse on line 104 and, in addition, generates a distinguishable digital word on line 107. This digital word is unique in the sense that it can be distinguished from all of the digital address words generated on line 106 and, in addition, from all of the amplitude digital words provided on line 101. Detection of either this unique digital word on line 107 or an energizing pulse on line 104 indicates that the video signal is presently in the horizontal flyback interval, and that one video line has ended and another is about to begin. Accordingly, the energizing pulse on line 104 is referred to hereinafter as a line pulse.

During the vertical flyback interval of the video signal, address generator 121 generates an energizing pulse on line 105 and, in addition, generates a distinguishable digital word on each of the lines 108 and 109. Both of these digital words on lines 108 and 109 are distinguishable from each other and each indicates by its presence that one video frame has ended and another video frame is about to begin. Only one of the digital words on lines 108 and 109 is processed for transmission to the receiver during any one of the vertical flyback intervals. The particular one which is chosen will be described hereinafter in connection with a discussion of the operation of the transmission gate 142.

It will be appreciated by those skilled in the art that the synchronization established by way of line 102 between the video signal in source 100 and address generator 121 can originate in either one of the two locations. The synchronization may be derived from the video signal in a system wherein a remote video-telephone station set provides a video signal input to the redundancy reduction apparatus shown in FIG. 1. On the other hand, where all of the apparatus shown in FIG. 1, including the source of the video signal, is located at the same point in the system, synchronization would most probably be derived from address generator 121.

The amplitude digital words on line 101 are coupled to the input of a blanking switch 110. Blanking switch 110 normally presents a constantly closed transmission path between its input and output and, therefore, all of the digital words on line 101 are normally coupled through blanking switch 110, by way of line 116, to one input of a subtractor circuit 112. As will be described hereinafter in connection with transmitter blanking control circuit 150, blanking switch 110 opens the transmission path to prevent passage of the digital words on line 101 when an energizing signal is provided to its control input by way of a line 143. The other input of subtractor circuit 112 is provided with a digital word whose value represents the amplitude of a sample from a previous video frame. This digital word provided at the second input of subtractor circuit 112 is derived from a frame memory 113. Synchronization of frame memory 113 is maintained with address generator 121 by way of line 139 such that the sample which is provided to the second input of subtractor circuit 112, by way of line 115, corresponds to the same spatial point in the video frame as the sample provided to the first input of subtractor circuit 112 by way of line 116. The absolute magnitude of the difference in amplitudes between the two samples is developed by subtractor circuit 112 and is coupled by way of line 144 to one input of a control logic circuit 117. If this absolute magnitude of the difference exceeds the threshold level provided by a threshold circuit 130, control logic circuit 117 develops an energizing signal at its output on line 131. If the absolute magnitude of the difference on line 144 equals or does not exceed the threshold level, no energizing signal is developed on line 131.

Normally, no energizing signal is provided on line 145 to the inhibit input of AND gate 118 and, therefore, the energizing signal on line 131 is coupled through AND gate 118 to one input of AND gate 119 and, in addition, through OR gate 146 to the control input of a transmission gate 135 by way of line 147.

An energizing signal on line 147 at the control input of transmission gate 135 causes this gate to connect the amplitude word on line 116 through to the input of frame memory 113, thereby substituting the new amplitude digital word for the previously stored amplitude word corresponding to the same spatial point in the video frame. When the amplitude difference is deemed to be not significant by control logic circuit 117, no energizing signal is provided to the control input of transmission gate 135 and, in this instance, the previously stored amplitude word from the output of frame memory 113 is connected by way of transmission gate 135 to the input of frame memory 113. Hence, frame memory 113 always contains an amplitude value for each of the samples of the spatial points within a video frame, and the amplitude values for any single spatial point is only updated with a new amplitude value when the amplitude change at that spatial point is found to exceed the threshold level in control logic circuit 117.

The inhibit input of AND gate 119 is connected to line 143. As indicated hereinabove, line 143 normally does not have an energizing signal. Therefore, the energizing pulse developed on line 122 as a result of a significant change in amplitude is coupled through AND gate 119 to one input of AND gate 133. The other input of AND gate 133 is connected to line 116. With AND gate 133 energized by an output from AND gate 119, the amplitude digital word on line 116 is coupled through AND gate 133 to one input of a buffer memory 120. The energizing pulse on line 132 is also connected to one input of an AND gate 134, the other input of which is connected to receive the address digital word developed on line 106 by address generator 121. With an energizing signal on line 132, this address digital word from line 106 is coupled through AND gate 134 through OR gate 136 to a second input of buffer memory 120.

In summary, providing there are no energizing signals on either of the lines 143 or 145, the determination by control logic circuit 117 that an amplitude sample represents a significant change results in coupling that amplitude digital word and its corresponding address word into the buffer memory 120. In addition, the amplitude word is utilized to update the amplitude value stored in frame memory 113 which corresponds to its spatial point within the video frame.

Buffer memory 120 provides a digital word on bus 157 which indicates by its value the number of words stored in buffer memory 120. Bus 157 is coupled to threshold circuit 130 which in turn uses the digital word on bus 157 to develop a threshold level which is a function of the number of words stored in the buffer memory. More specifically, as the buffer memory fills toward its maximum capacity, the threshold level is raised. As the buffer memory empties, the threshold level is lowered. When the buffer memory is nearly empty, the threshold level is set to zero in order that every new sample on line 116 will be considered as significant and therefore coupled into the buffer memory. In this way, the buffer memory will always have words in storage in readiness for transmission to the receiving location.

During the vertical flyback interval, the digital word developed on line 108 is coupled through transmission gate 142 (when the latter gate is inoperative) and through OR gate 136 to the second input of buffer memory 120. During the horizontal flyback interval, the digital word on line 107 is coupled through OR gate 136 to the second input of buffer memory 120. These distinguishable digital words indicating both vertical and horizontal flyback intervals are accompanied in the buffer memory 120 with amplitude words having logical "Os" in all of their bit positions. In the present embodiment an amplitude word having all logical "Os" is equivalent to black level video.

Buffer memory 120 is read out on a first-in-first-out basis, and the digital words which are read out are coupled by a digital transmitter 140 to a transmission channel 141. Since the receiver may determine when each of the horizontal and vertical flyback intervals occur by the detection of the distinguishable digital words from lines 107 and 108, the address word provided on line 106 need only indicate the position of each amplitude sample within its video line. Line synchronization is maintained by the presence of the digital words from line 107.

Figure 2:
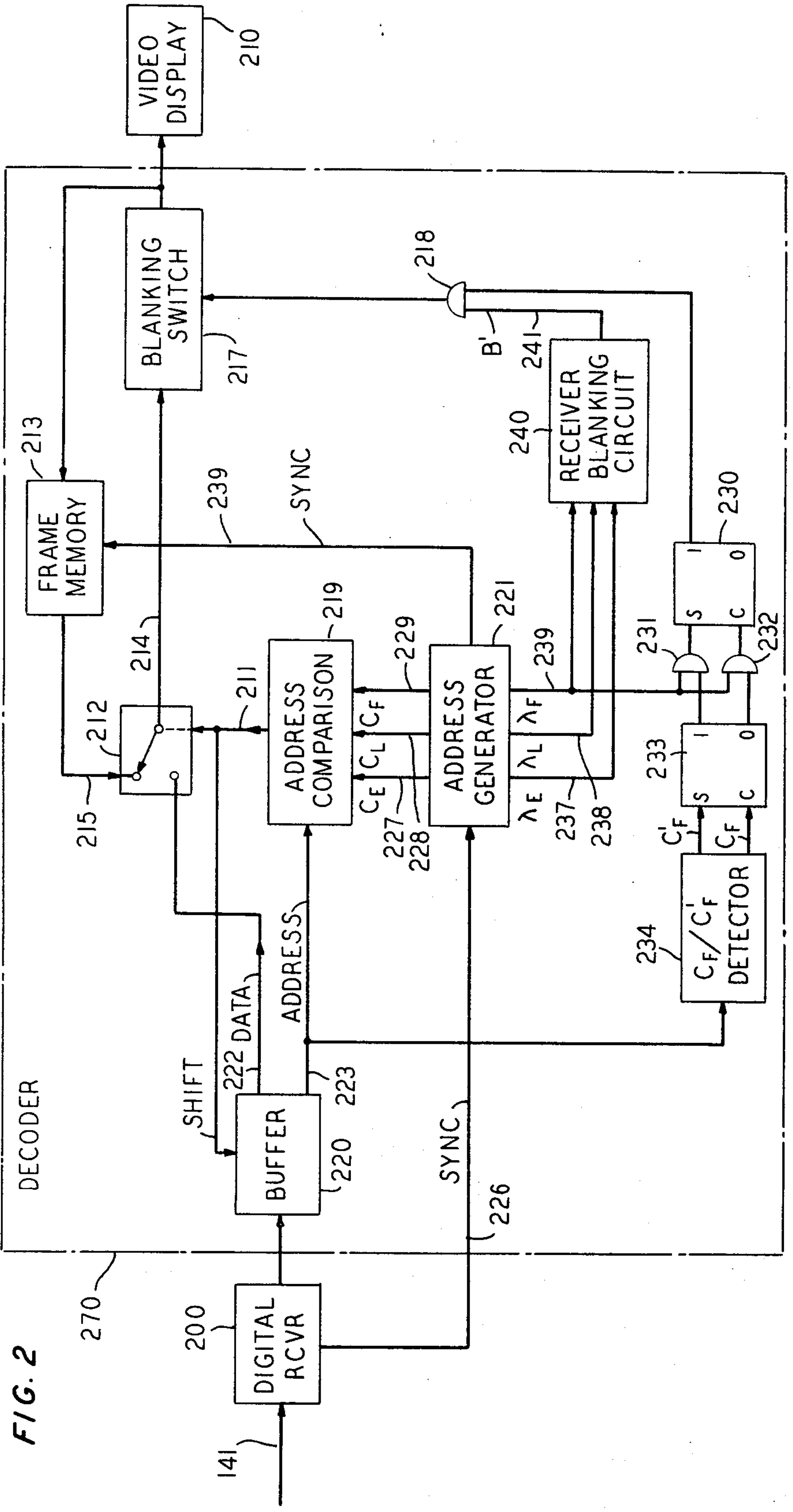
FIG. 2 is a schematic block diagram of a receiving terminal constructed in accordance with the present invention.

In FIG. 2, the digital words on transmission channel 141 are coupled by a digital receiver 200 into a buffer memory 220. The oldest word stored in buffer memory 220 is presented at the outputs of buffer memory 220 on lines 222 and 223. The amplitude bits are presented on line 222, whereas the address digital bits are presented on line 223. If the digital word is one of the distinguishable digital words from lines 107, 108 or 109, they are presented on line 223. A synchronization link is established by way of line 226 between digital receiver 200 and an address generator 221. The bit rate on transmission channel 141 is utilized by digital receiver 200 to synchronize address generator 221, such that address generator 221 provides digital codes on its output lines 227, 228 and 229 at the same rate at which digital codes are provided by address generator 121 in FIG. 1. The digital words provided on line 227 correspond to the address codes provided on line 106 in FIG. 1. The digital word provided on line 228 is identical to the digital word provided on line 107 and is provided at a rate equal to that at which the horizontal blanking intervals are to occur in the output video waveform. Finally, a digital word is provided on line 229 which is identical to the digital word provided on line 108, and it is provided at the rate at which the vertical blanking interval is to occur in the output video waveform. Energizing pulses are also produced by address generator 221 on lines 237, 238 and 239 each time that a digital word is generated in one of the output lines 227, 228 and 229, respectively.

The digital words on lines 227, 228 and 229 are coupled to the inputs of an address comparison circuit 219. The digital address word which is available at the output of buffer memory 220 on line 223 is also coupled to the input of address comparison circuit 219. When address comparison circuit 219 detects that it is being simultaneously provided with identical digital words on line 223 and on one of the lines 227, 228 or 229, address generator 219 produces an energizing signal at its output on line 211. Line 211 is connected to the control input of a transmission switch 212 and also to the shift input of buffer memory 220. The presence of an energizing signal on line 211 causes transmission gate 212 to operate and thereby connect output line 222 of buffer memory 220 through to the input of a blanking switch 217. Normally, the blanking switch 217 provides a closed transmission path between its input and output and, therefore, the amplitude digital word shifted out of buffer memory 220 by the energizing signal on line 211 is coupled through transmission gate 212, through blanking switch 217, to the input of a video display unit 210. In addition, the amplitude digital word is coupled from the output blanking switch 217 to the input of a frame memory 213.

During the intervals when no energizing signal is presented on line 211, transmission gate 212 remains in its inoperative state coupling the output of frame memory 213 to the input of blanking switch 217. As a result, the previously stored amplitude value in frame memory 213 are permitted to recirculate in frame memory 213 until such time that a new value for a picture element is detected to be present at the output of buffer memory 220. At this time, the old value is blocked at the output of frame memory 213 by the operation of transmission gate 212 and the new value for this picture element is coupled out of buffer memory 220 and into frame memory 213. As long as blanking switch 217 remains inoperative, the amplitude values for all of the picture elements stored in frame memory 213 provide a continuous video signal at the input of video display unit 210.

The operation of the apparatus described thus far in connection with FIGS. 1 and 2 in the drawings is substantially the same as the operation of several conditional replenishment video systems which have been described in the prior art even though several new circuits have been added to the system. These new circuits in combination with circuits to be described hereinafter provide a conditional replenishment video system whose operation is different and advantageous from those found in the prior art.

In FIG. 1, when buffer memory 120 has stored a predetermined number of digital bits and is in danger of being overloaded, an energizing pulse is produced by buffer memory 120 on line 126. This energizing signal sets a flip-flop 127 which in turn causes an energizing signal to be produced at the "1" output of flip-flop 127. The energizing pulse produced by buffer memory 120 on line 126 is shown in waveform 502 in FIG. 5 as a positive rise in potential 512. This has been shown to occur at an arbitrary point between two start-of-frame pulses on line 105 arbitrarily designated as "0" and "1" in waveform 501 in FIG. 5. The voltage waveform at the "1" output of flip-flop 127 is shown as waveform 503 in FIG. 5. As indicated in waveform 503, the energizing signal on line 126 causes flip-flop 127 to be set at the instant designated as 513 in waveform 503. The resulting energizing signal at the logical "1" output of flip-flop 127 is coupled to the control input of a transmission gate 142 and is also coupled through OR gate 129 to the inhibit input of AND gate 118 and also to the input of a transmitter blanking control circuit 150. Operation of transmission gate 142 by the energizing signal from flip-flop 127 permits the digital word on line 109 during the next vertical blanking interval to be coupled through transmission gate 142 into buffer memory 120 in place of the digital code on line 108. Detection of the word from line 109 at the receiving location will be utilized in a manner to be described hereinafter to inform the receiving location that the transmitting terminal is operating in an overload condition.

As pointed out hereinabove, an energizing pulse is produced on line 105 simultaneously with the generation of the digital words on lines 108 and 109. This energizing pulse is coupled to the clear input of both flip-flops 127 and 128. When flip-flop 127 is cleared, the resulting energizing signal at its "0" output causes flip-flop 128 to be set a very short interval after it is cleared by the pulse from line 105. The clearing of flip-flop 127 removes the energizing signal from the control input of transmission gate 142. However, the small amount of delay present in flip-flop 127 and transmission gate 142 permits the digital word on line 109 to be coupled through to buffer memory 120 before the transmission gate 142 reconnects to line 108. The clearing of flip-flop 127 also removes the energizing signal from one input of OR gate 129 but the almost simultaneous setting of flip-flop 128 by the energizing signal at the logical "0" output of flip-flop 127 provides an energizing signal from the logical "1" output of flip-flop 128 to a second input of OR gate 129. Flip-flop 128 will remain in this set condition until the next appearance of a start-of-frame pulse on line 105, at which time it is again cleared.

Figure 5:
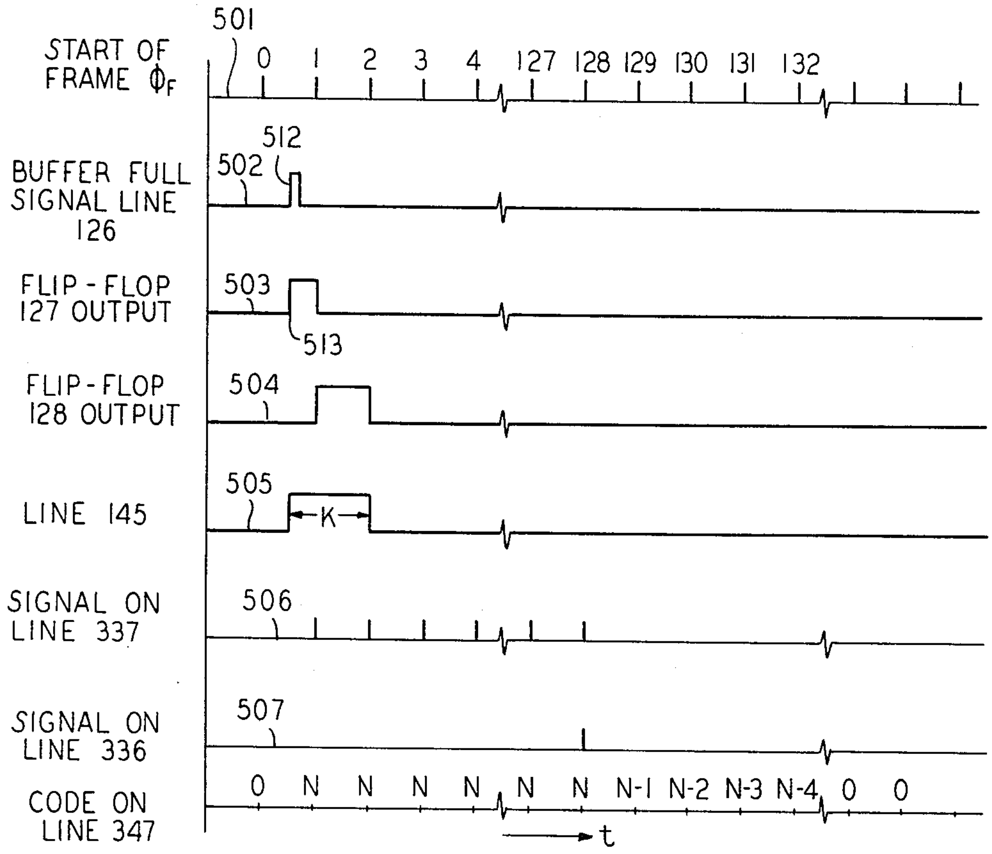
FIGS. 5 and 6 each show a series of waveforms useful in describing the operation of the apparatus shown in FIGS. 1 through 4 of the drawings.

The energizing signal provided at the logical "1" output of flip-flop 128 is indicated in FIG. 5 by waveform 504. The energizing signal provided on line 145 at the output of OR gate 129 is designated as having an interval K and is shown as waveform 505 in FIG. 5. This energizing signal of interval K will always be present for the interval between the instant that an overload signal is produced by buffer memory 120 on line 126 and the end of the next succeeding video frame. Hence, K will always be at least as long in duration as one video frame interval. During this interval K, when an energizing signal is present on line 145, the inhibit input of AND gate 118 is energized, thereby preventing any energizing signal on line 131 from being coupled through AND gate 118. As a result, no amplitude digital words may be either coupled through to buffer memory 120 or utilized to update frame memory 113 during the interval when the energizing signal is present on line 145. This interval of quiescence is introduced in order to enable buffer memory 120 to retreat from its overload condition.

The apparatus described thus far may be utilized without any of the additional apparatus to be described hereinafter to provide a system with new and advantageous results not to be found heretofore in prior art systems. The K interval of quiescence equal to at least one frame time in duration permits the buffer memory to retreat considerably from its overload condition. After the interval K, the system may be released to again process or encode all of the picture elements in the video frame. If the scene being viewed still contains a large amount of activity, the buffer memory will again be filled to the point where an overload signal is produced on line 126, and an additional K interval of quiescence will be introduced by the inhibiting of AND gate 118 for at least one video frame time. This process of repeated K intervals continues until the activity in the scene is reduced to the point where buffer memory 120 can handle the selected samples without overloading.

During the K intervals, no amplitude samples are selected for transmission to the receiving location and, therefore, the video signal which is displayed at the receiving location is simply a frame repetition of the picture element amplitudes stored within frame memory 213. Accordingly, repeated K intervals resulting from prolonged activity produce jerky motion in the receiver's displayed picture. In some systems, this may occur so infrequently with the type of scenes being viewed that the displayed picture is subjectively satisfactory and no further apparatus is necessary. For other scenes, however, the picture may not be satisfactory and the additional apparatus in FIG. 1, i.e., the transmitter blanking control circuit 150, blanking switch 110, indicator circuit 155 and their receiver counterparts in FIG. 2, are necessary to produce a picture without jerky motions under all degrees of activity in the scene being viewed.

In response to the energizing pulse of interval K on line 145, transmitter blanking control circuit 150 produces a series of energizing pulses having nonuniform spacing on line 143. This series of pulses on line 143 begins during the interval K in response to the energizing pulse on line 105 which indicates that a new frame interval has begun. The series of energizing pulses on line 143 is of constant amplitude, but the series varies in the time domain in the following manner. An energizing level is produced on line 143 for N video lines immediately following and preceding the vertical flyback interval. For the remainder of the video lines in the center part of the video frame, an energizing level is produced on line 143 for N picture elements at the beginning and end of each video line immediately following and preceding the horizontal flyback intervals. In other words, an energizing signal is developed on line 143 for those picture elements of the video frame which lie within N picture elements of each edge of the displayed picture. In the present embodiment, where each video frame has 220 lines and each line has 221 picture elements, N is equal to 30.

In response to an energizing level on line 143, blanking switch 110 prohibits the passage of the video amplitude samples on line 101 through to its output line 116. In addition, during each interval that the video samples are blocked, a constant level of video amplitude is established at the output of blanking switch 110 on line 116. This constant level of video amplitude in the present embodiment is made equal to the black level of the video signal.

During the initial interval when the energizing pulses on line 143 are unchanging in their duration, only the ($220 - 2 \times 30$ =) 160 video lines from the center of the video frame will have their ($221 - 2 \times 30$ =) 161 picture elements from the center of each video line transmitted through blanking switch 110 for processing by coder 160. These picture elements from the central area of the picture are processed in the normal manner after the interval K has terminated since the energizing pulse is at that time removed from the inhibit input of AND gate 118. The black level signal established by blanking switch 110 is then coupled into frame memory 113 for all of the picture elements present within the first and last 30 video lines in the video frame and for the first and least 30 picture elements from the end of each of the other 160 video lines. This black level is loaded into frame memory 113 for all of these picture elements since an energizing signal is present on line 143 during each of these picture elements, and this energizing signal on line 143 is coupled through OR gate 146 to the control input of transmission gate 135.

The energizing signal on line 143 is also coupled to the inhibit input of an AND gate 119. For all of the picture elements which have a black level established by blanking switch 110, the energizing level on line 143 prevents any energizing signal on line 122 from being coupled through AND gate 119 to the inputs of AND gates 133 and 134. Therefore, the amplitude values corresponding to the established black level and the corresponding address digital words for these picture elements are prohibited from being coupled into buffer memory 120. Consequently, buffer memory 120 only receives those picture elements which have encountered a change in amplitude in the center area of the picture.

This interval of nonuniform but unchanging energizing pulses normally exists at the output of the transmitter blanking control circuit 150 for 128 video frame intervals after the initial buffer memory overload signal on line 126. In the present embodiment, where each video frame interval has a duration equal to one-sixtieth of a second, 128 frame intervals correspond to approximately 2 seconds. It has been determined experimentally that a burst of activity by a participant in a video telephone system lasts on the average for an interval of about 2 seconds. Consequently, after the interval of about 2 seconds, the activity which has caused buffer memory 120 to be overloaded will have ceased in about 50 percent of the encountered overload situations.

After the interval of 128 frames, the duration of each of the energizing pulses on line 143 is decreased in a manner to be described hereinafter in connection with FIG. 3. Consequently, during the video frame which follows the 128-video-frame-interval, one additional line at the top and bottom of the center area of the unblanked picture and one column of picture elements at each side of the center area of the unblanked picture will be added to those picture elements which are encoded by the coder 160.

The 128-frame-blanking-interval can be cut short, that is, terminated before 128 video frames have elapsed, by an energizing signal on line 158 from buffer memory 120. An energizing signal is developed on line 158 by buffer memory 120 when the number of words stored in the buffer memory drops to a predetermined number of words. In the present embodiment, this predetermined number equals the number of words which can be read out of the buffer memory during the vertical flyback interval. As a result, initiation of the operation during which blanking is removed is caused to occur in less than 128 video frames past the overload signal in those situations where the buffer memory indicates that the total number of 128 video frames is not necessary.

In the present embodiment, where a video frame is composed of 220 sequentially scanned lines and each line is composed of 221 picture elements or samples, 30 lines at both the top and bottom of the picture and 30 picture elements at each side of the picture are blanked by the blanking switch 110 during the 128-frame-interval. With the blanking removed at the rate of two lines and two columns of picture elements per video frame, after 30 video frames all of the blanking is removed and all of the picture elements of the video signal are again processed by coder 160. During the interval of blanking removal, the picture elements which are removed from control by the blanking switch 110 will insert new amplitude values into frame memory 113 and their corresponding amplitudes and address words will be coupled into buffer memory 120 for transmission to the receiving location. As will be apparent to those skilled in the art, after a more thorough discussion hereinbelow of the transmitter blanking control circuit, if a spurt or burst of activity occurs during the unblanking period an entirely new blanking interval of 128 video frames is again established.

Line 170 out of the transmitter blanking control circuit 150 provides an energizing signal for the blanking interval after the initial buffer memory overload signal on line 126 up to the start of blanking removal. During the blanking interval, indicator circuit 155 responds to the energizing signal on line 170 and provides a visual indication to the party whose activity has caused an overload of the buffer memory and a cropping of the video signal. Indicator circuit 155 may be constructed of a transistor switch which causes the illumination of a pilot light when it is triggered into its conductive state by the energizing signal on line 170. As a result, a party by observing the light may decrease his activity in order to re-establish the full field of view in the video picture. On the other hand, if he desires to show a rapidly moving object he may confine that object to the center area of the camera's field of view.

In FIG. 2, when the digital word developed on line 109 of coder 160 appears at the output of buffer memory 220 on line 223, detector circuit 234 responds to this digital word by providing an energizing signal which sets a flip-flop 233. The resulting energizing signal produced at the logical "1" output of flip-flop 233 energizes one input of an AND gate 231. With the next appearance of an energizing signal on line 239 at the beginning of the next succeeding video frame, the second input of AND gate 231 is energized thereby causing a flip-flop 230 to be set. A receiver blanking circuit 240, in response to the energizing signals provided during each picture element on line 237, at the start of each video line on line 238, and at the start of each video frame on line 239, generates at its output on line 241 a series of nonuniform but unchanging energizing pulses identical to the series which is generated by transmitter blanking control circuit 150 during the above-mentioned 128-frame-blanking-interval. This series of energizing pulses on line 241 is normally blocked from being coupled through an AND gate 218 to the control input of blanking switch 217 since flip-flop 230 is normally in its cleared state. When flip-flop 230 is set, however, by the first energizing pulse on line 239 after the detection of the code word from line 109 by detector circuit 234, AND gate 218 is energized and the series of energizing pulses on line 241 is coupled through to the control input of blanking switch 217.

This series of energizing pulses on line 241 is provided to the control input of blanking switch 217 for a duration equal to one frame interval as determined by address generator 221. When the next start-of-frame code word from line 108 is detected at the output of buffer memory 220 by detector circuit 234, flip-flop 233 is cleared and the next energizing pulse on line 239 is coupled through AND gate 232 to the clear input of flip-flop 230. With flip-flop 230 in its cleared state, the stream of energizing pulses from receiver blanking circuit 240 is again blocked by AND gate 218 from being coupled through to the control input of blanking switch 217. During this single frame interval, however, blanking switch 217 blocks the passage of the picture elements in the first and last 30 video lines of a video frame and, in addition, blocks the first and last 30 picture elements in the center 160 lines of the picture. The amplitudes of these picture elements which are blocked by blanking switch 217 are not permitted to pass from the output of frame memory 213 back to the input of frame memory 213. Instead, blanking switch 217 for these picture elements establishes a constant video level within frame memory 213. This constant video level established by blanking switch 217 is identical to the video level established by blanking switch 110 in FIG. 1.

The constant video amplitude established for the blanked picture elements within frame memory 213 will remain unchanged until a new value for these picture elements is received by digital receiver 200 and shifted to the output of buffer memory 220. No new values will be received, however, until the transmitter blanking control circuit 150 in encoder 160 begins to remove the blanking at the above-mentioned rate. After all of the blanking is removed at the transmitting terminal, the new values of amplitude for all of the blanked picture elements are eventually received by buffer memory 220 and these values are utilized to establish the new updated amplitudes for these picture elements within frame memory 213. During the interval when the picture elements at the sides of the picture are blanked by blanking switch 217 and set at a constant video level, the video display unit 210 will display a picture which has been cropped or framed at its edges. The center area of the picture will remain unaffected by the blanking, with new updated amplitude values being added each time they are shifted to the output of buffer memory 220.

Figure 3:
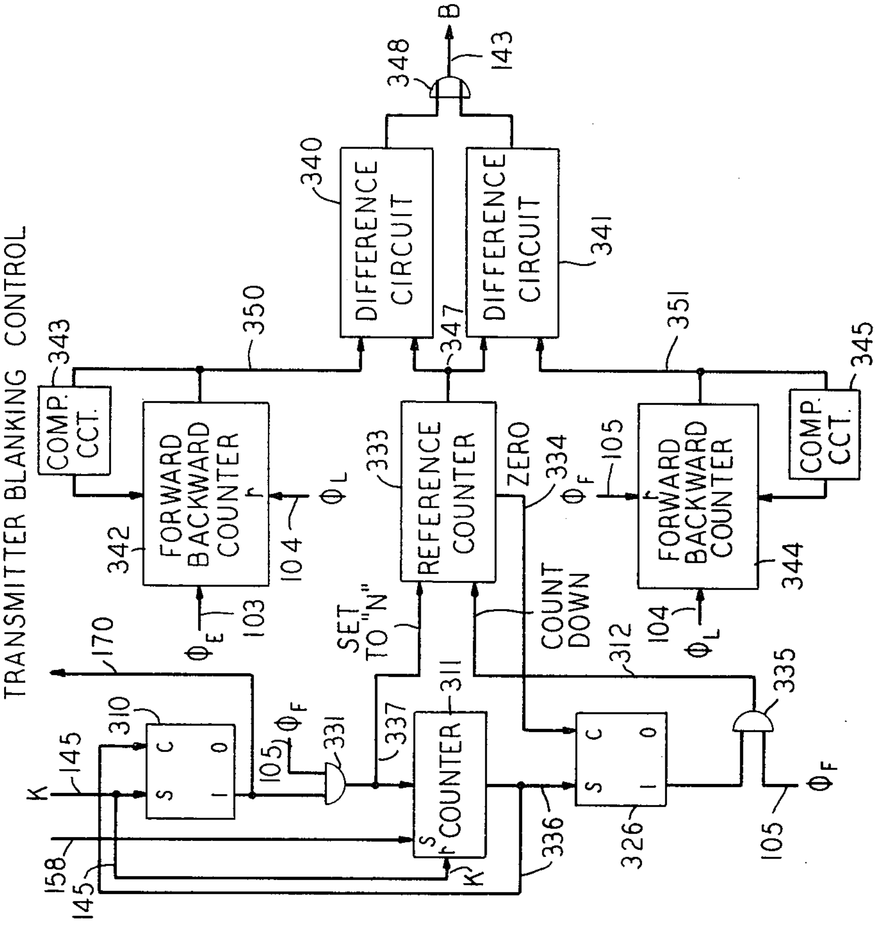
FIG. 3 is a schematic block diagram of the transmitter blanking control circuit shown as a single block in FIG. 1 of the drawings.

A schematic block diagram of one embodiment for the transmitter blanking control circuit 150 is shown in FIG. 3. The initial rise of the energizing pulse on line 145 for interval K causes a flip-flop 310 to change to its set condition and, in addition, resets a counter 311 to zero. With flip-flop 310 in its set condition, the energizing signal at its "1" output on line 170 energizes one input of an AND gate 331. The other input of AND gate 331 is connected by way of line 105 to the energizing pulses available from address generator 121 during each of the vertical flyback intervals. After flip-flop 310 has been set, each of the energizing pulses on line 105 are coupled through AND gate 331 to the input of counter 311 and also to the set input of a reference counter 333.

Each pulse delivered from AND gate 331 to the input of counter 311 causes that counter to advance its internally stored count by one. This internally stored count continues to advance until a value of 128 is developed within counter circuit 311. At that point, counter circuit 311 provides an energizing signal at its output on line 336.

Counter circuit 311 can be advanced to the internally stored count of 128 by an energizing signal on line 158 at its set input. As pointed out hereinabove, buffer memory 120 provides an energizing signal on line 158 if its level of storage drops to a predetermined number of words. If counter 311 is so advanced by buffer memory 120, the effect is simply to shorten the blanking interval, and the operation of the remainder of the circuits in the transmitter blanking control 150 proceeds exactly as though the counter had been advanced one step at a time to the count of 128.

During the interval when counter circuit 311 is advancing toward 128, the energizing pulses from line 105 continue to be coupled to the set input of reference counter 333, but only the first pulse will have an effect during this interval since no pulses are applied during this interval by way of line 312 to the counting input of reference counter 333. As a result of setting reference counter 333, this counter provides a digital word at its output on line 347 whose value is equal to N (in the present embodiment N = 30). This output from reference counter 333 is applied to one input of each of the difference circuits 340 and 341 in FIG. 3.

The second input of difference circuit 341 is coupled to the output of forward-backward counter 344. Each of the frame pulses on line 105 resets forward-backward counter 344 to zero. Each of the video line pulses on line 104 causes the forward-backward counter 344 to initially advance its count by one. The count established within counter 344 is coupled by way of line 351 to the input of a comparison circuit 345. When the count on line 351 reaches a value equal to one-half of the number of lines within a video frame, comparison circuit 345 generates an output which is applied to counter circuit 344, thereby causing the counter circuit to reverse its operation in that each succeeding pulse which is applied on line 104 will thereafter cause the counter circuit to decrease its count value by one. Hence, in the present embodiment where each video frame contains 220 video lines, the digital word value on line 351 starts out as zero at the beginning of each frame, increases to the value of 110, and then decreases to zero.

The second input of difference circuit 340 is connected by way of line 350 to the output of a similarly constructed forward-backward counter 342. Each video line pulse on line 104 resets counter 342 to zero. Each picture element pulse on line 103 triggers the input of forward-backward counter 342. The initial picture element pulses in a video line cause the count established by counter circuit 342 to be advanced by one. When the output digital word on line 350 reaches a value which equals one-half of the number of picture elements in a video line, a comparison circuit 343 provides an energizing signal to forward-backward counter circuit 342 such that each succeeding pulse on line 103 causes counter circuit 342 to decrease its count by one. Accordingly, in the present embodiment where each video line contains 221 picture elements, the digital word on line 350 established by counter circuit 342 starts out at zero for each video line, increases to the value of 111, and thereafter decreases to the value of zero.

Each of the difference circuits 340 and 341 is constructed so that an energizing signal is provided at its respective output when the digital word present at its first input on line 347 is greater than or equal to the digital word provided at its second input on either of the lines 350 or 351, respectively. Consequently, in the present embodiment where N is equal to 30, difference circuit 341 initially provides an energizing signal at its output during the first 30 and the last 30 lines of a video frame. Similarly, difference circuit 340 initially provides an energizing signal at its output during the first 30 picture elements and during the last 30 picture elements of each video line. Each of the outputs of difference circuits 340 and 341 is coupled through an input of an OR gate 348 to line 143. The series of energizing pulses developed on line 143 provides the necessary blanking described hereinabove in connection with blanking switch 110 during the 128-frame-interval.

After counter circuit 311 reaches an internal count of 128 (either by counting frame pulses on line 105 or by being set by an energizing signal on line 158), it provides an energizing signal on line 336 to the set input of flip-flop 326 and also to the clear input of flip-flop 310. With flip-flop 310 cleared, the frame pulses on line 105 are no longer permitted to couple through AND gate 331 to the set input of reference counter 333. Instead, each of the frame pulses on line 105 are coupled through an AND gate 335 to the count-down input of reference counter 333 since AND gate 335 is energized by flip-flop 326 after this flip-flop has been set. Each energizing pulse which is coupled from AND gate 335 to the count-down input of counter circuit 333 causes that counter to decrease its internal count value by one. Hence, during each succeeding frame after the 128-frame-interval, the value of the digital word provided by counter circuit 333 on line 347 is decreased by one. As a result, the energizing pulses provided by difference circuits 340 and 341 are provided for shorter and shorter intervals during each of the succeeding frames.

Figure 6:
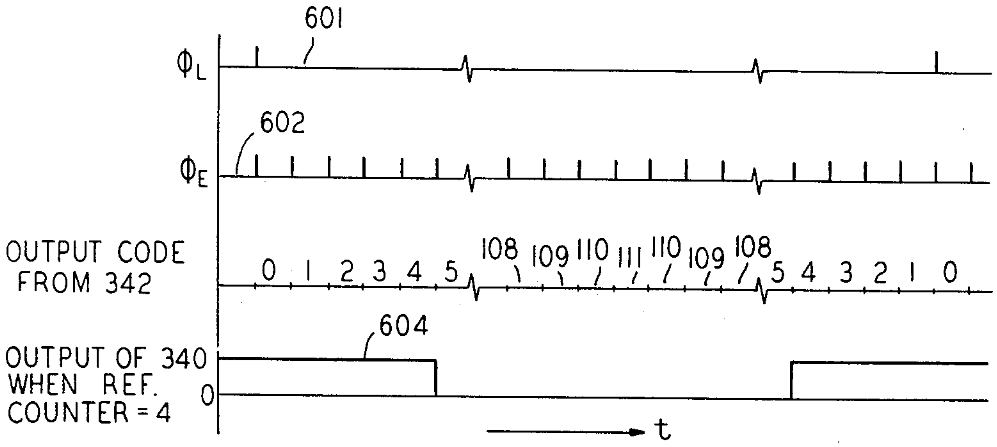

An example of the energizing signal provided by difference circuit 340 during each video line after the output of reference counter 333 has been decreased to the value of four is illustrated by the waveforms shown in FIG. 6. As indicated in waveform 601 of FIG. 6, the line pulse from line 104 causes the output from counter circuit 342 to be set to zero. Each succeeding picture element pulse on line 103 causes that count from counter circuit 342 to be initially advanced by one. When the output from counter circuit 342 is less than or equal to the value of four, difference circuit 340 provides an energizing signal at its output as indicated by waveform 604. When, however, the output from counter circuit 342 exceeds the value of four, difference circuit 340 provides an output voltage equal to zero. When counter circuit 342 reaches the value of 111, comparison circuit 343 reverses the counter circuit and each succeeding pulse on line 103 causes the counter circuit to decease its count by one. When the count at the output of counter circuit 342 is again lower than the value of four, difference circuit 340 provides an energizing signal at its output.

When the frame pulses from line 105 decrease the count within reference counter 333 to the value of zero, counter 333 provides an energizing signal on line 334 which clears flip-flop 326. With flip-flop 326 in its cleared state, no further frame pulses from line 105 are permitted to pass through AND gate 335 to the counting input of reference counter 333. Thereafter, no energizing signal is developed by either of the difference circuits 340 or 341 during any portion of the active region of the video frame interval.

Figure 4:
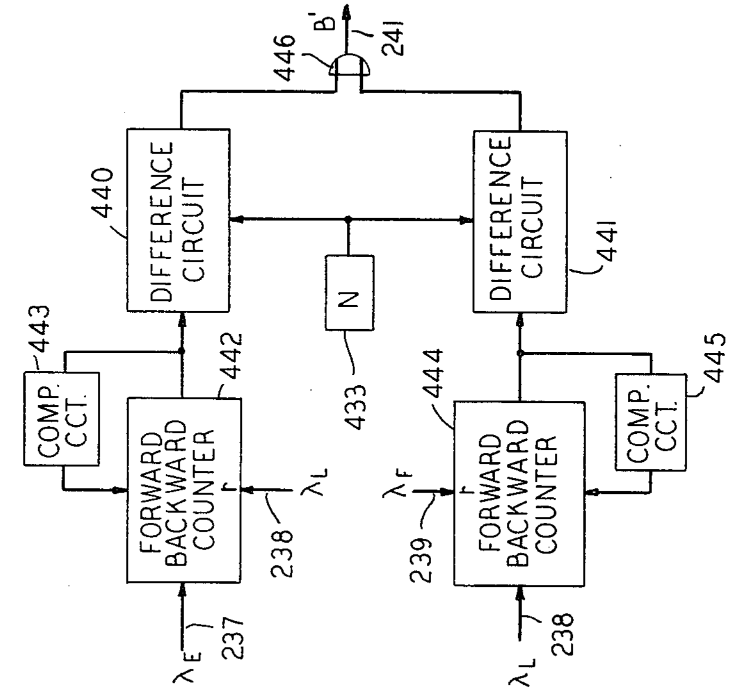
FIG. 4 is a schematic block diagram of the receiver blanking circuit shown as a single block in FIG. 2 of the drawings.

The schematic block diagram for one embodiment of a receiver blanking circuit 240 is shown in FIG. 4 of the drawings. Each frame pulse developed in the decoder 270 during the vertical blanking interval on line 239 resets forward-backward counter 444 to zero. Each line pulse developed during the horizontal blanking interval on line 238 advances the output of counter circuit 444 one count at a time to a value which equals one-half of the number of video lines within a video frame. At that point, comparison circuit 445 develops an energizing signal at an input of counter circuit 444 which causes that counter circuit to reverse its operation such that each succeeding pulse on line 238 decreases the value of the count by one. The count value at the output of counter circuit 444 is connected to one input of a difference circuit 441, the other input of which is connected to a constant word generator 433. Generator 433 develops a digital word at its output having the value of N (equal to 30 in the present embodiment). Difference circuit 441 develops an energizing signal at its output whenever the value of the digital word provided by counter circuit 444 is less than the value of N.

In a fashion identical to that described hereinabove in connection with counter circuit 342, a forward-backward counter circuit 442 develops an increasing and a decreasing count during each of the video lines in the receiving decoder. Difference circuit 440 responds to the output of counter circuit 442 by developing an energizing signal at its output whenever the digital word provided by counter circuit 442 is less than the value of N which is provided by word generator 433. The outputs of both difference circuits 440 and 441 are combined in OR gate 446 to provide a blanking waveform on line 241 in the decoder circuit of FIG. 2 identical to the blanking waveform provided by transmitter blanking control circuit 150 during the blanking interval. Unlike transmitter blanking control circuit 150, receiver blanking circuit 240 constantly produces its blanking waveform, and the waveform is coupled or not coupled to the blanking switch 217 depending on the condition of gate 218.

Figure 7:
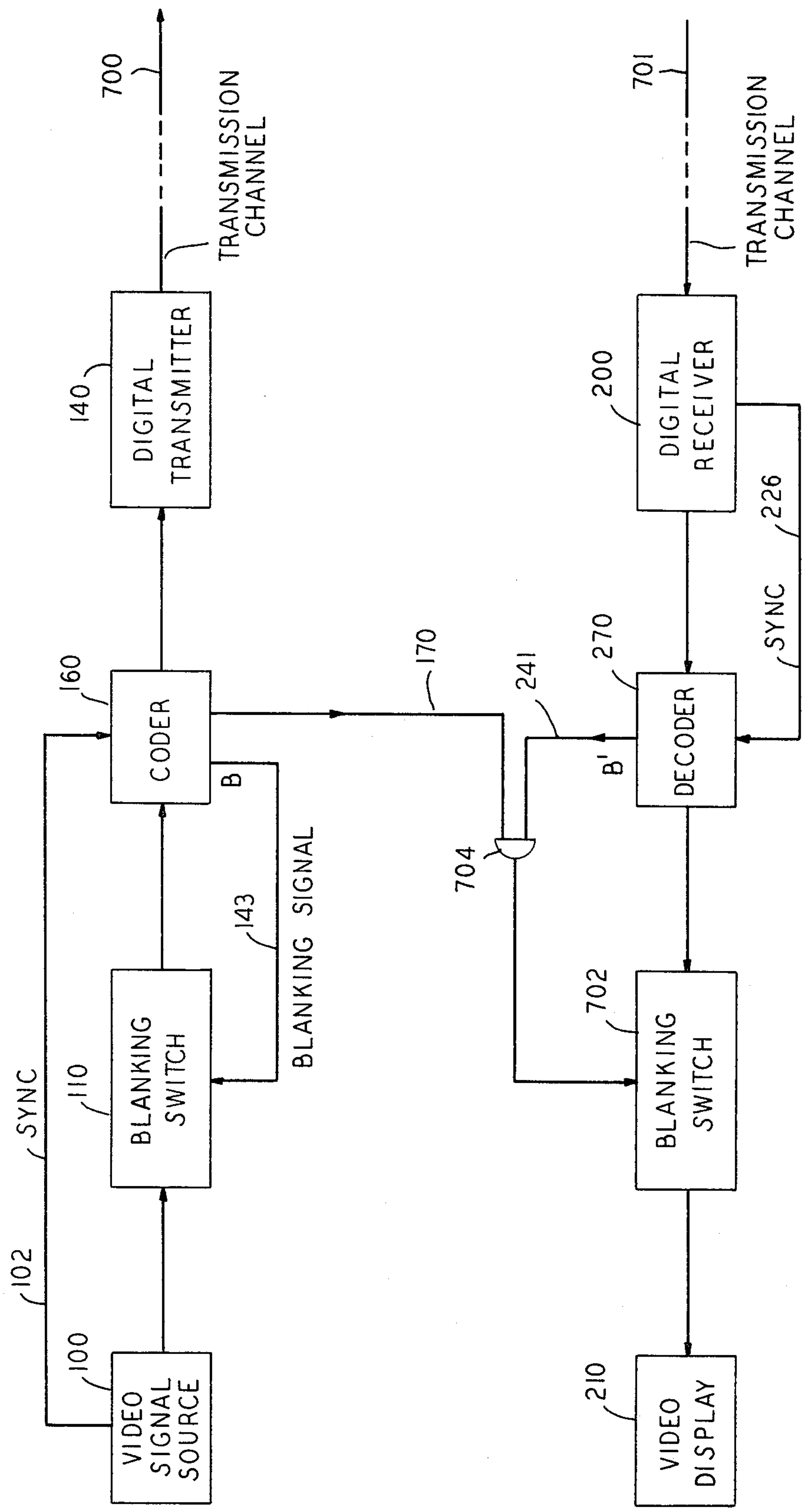
FIG. 7 is a schematic block diagram of a transmitter and receiver apparatus for a video-telephone communication system constructed in accordance with the present invention.

FIG. 7 shows a schematic block diagram of a transmitting apparatus and a receiving apparatus at the same location connected in a novel arrangement such that the receiving apparatus serves as the indicator circuit. Video signal source 100, blanking switch 110, coder apparatus 160 and digital transmitter 140 operate in a fashion identical to that described hereinabove in connection with the apparatus shown in FIG. 1. These four units comprise the transmitting apparatus which generates digital bits on a transmission channel 700, which bits are coupled to a receiving apparatus in a remote location. The digital bits which correspond to the video signal being transmitted from that other remote location are received on a transmission channel 701 and are coupled by a digital receiver 200 to a decoder apparatus 270. The digital receiver 200 and decoder 270 operate in a fashion identical to the similarly designated apparatus described hereinabove in connection with FIG. 2.

Unlike the FIG. 1 apparatus, the indicator circuit 155 in FIG. 7 is not simply a transistor switch in combination with some indicator device such as a pilot light. In the FIG. 7 apparatus, the indication that a transmitting party is causing a cropping or reduction in the field of view of his transmitted video signal is provided by that party's own receiving apparatus. In FIG. 7, a blanking switch 702 is inserted between decoder apparatus 270 and the video display apparatus 210. Line 170 from the logical "1" output of flip-flop 310 in the transmitter blanking control circuit 150 of coder 160 is coupled to one input of an AND gate 704. The other input of AND gate 704 is coupled to receive the blanking signal generated on line 241 in the decoder apparatus 270. As indicated hereinabove, line 241 always has a series of energizing pulses of unchanging and nonuniform duration with energizing levels established during those picture elements which correspond to the edges of the displayed video frame. An energizing signal on line 170, however, only occurs when the party has caused his transmitting apparatus to operate in the overload condition. As pointed out hereinabove, this signal remains on line 170 for an interval of 128 frames. Accordingly, when the activity of the transmitting party is such that he generates an energizing signal on line 170, this signal causes AND gate 704 to be energized which in turn permits the blanking signal on line 241 to be coupled through AND gate 704 to the control input of blanking switch 702. This causes blanking switch 702 to operate and blank those picture elements in his received picture which lie within 30 picture elements of each edge of the displayed video frame. As a result, the party who causes the cropping of his transmitted picture will also cause the picture which he sees to be cropped by the same extent and for approximately the same duration.

What has been described before is a specific embodiment of the present invention. Numerous modifications may be made by those skilled in the art without departing from the spirit and scope of the present invention. For example, the invention has been described in terms of an embodiment which utilizes line sequential scanning but the invention is equally applicable to an interlace system in which the quiescent or blocking interval need only last for one field time. Accordingly, for purposes of defining the invention, the words field and frame are synonymous. Furthermore, the rate at which the blanking or cropping is removed may be controlled to be other than one row of picture elements on each edge of the picture per frame.

We claim:

1. A method of processing samples from a video signal having frame intervals to reduce the redundancy in the transmitted information from said video signal which comprises selecting samples from each frame interval to be transmitted to a receiving location, storing the selected samples so as to provide a reservoir of samples which can be transmitted at a constant bit rate, generating an overload signal when the number of selected samples in storage equals a predetermined number, stopping the selection of all samples in response to said overload signal for a quiescent interval equal to at least one frame interval, and blocking the storage of samples which correspond to spatial points at the edges of a displayed video frame for a plurality of frame intervals after said quiescent interval.

2. A method of processing samples from a video signal as defined in claim 1 wherein said blocking of the storage of samples for a plurality of frame intervals is removed gradually over a period of several frame intervals by decreasing the number of spatial points at the edges of the displayed video frame whose samples are being blocked from storage.

3. A method of processing samples from a video signal as defined in claim 1 wherein said blocking of the storage of samples is terminated in response to storing less than a second predetermined number of selected samples.

4. Redundancy reduction apparatus for use with a video signal which provides the amplitude for each spatial point within an array of spatial points during each frame interval, said apparatus comprising a source of video signal samples each one of which represents a predetermined spatial point within said array of spatial points, a coder circuit for selecting samples to be transmitted to a receiving location, said coder circuit including a buffer memory which serves to store said selected samples prior to their transmission, said buffer memory having the means to provide an overload signal when it has a predetermined number of samples in storage, a blanking switch means for normally coupling the video signal samples to said coder circuit, said blanking switch means being operative in response to an energizing signal at its control input to block the samples from being coupled to said coder circuit, and means responsive to said overload signal for operating said blanking switch means so as to prohibit the coupling to said coder circuit of those samples which correspond to spatial points at the edges of said array of spatial points.

5. Redundancy reduction apparatus as defined in claim 4 wherein the coder circuit includes a means responsive to said overload signal for totally inhibiting the selection of samples for an interval at least as long as one frame interval.

6. Redundancy reduction apparatus as defined in claim 5 wherein said coder circuit includes a means for coupling a code word to said buffer memory in response to said overload signal to indicate to a remote receiving apparatus that said coder circuit is operating under an overload condition.

7. Redundancy reduction apparatus as defined in claim 4 wherein said coder circuit includes means to operate an indicator circuit during the interval when said blanking switch means is operated.

8. In combination, a source of new video signal samples each one of which represents a video amplitude at a specific spatial point in a displayed video frame, a frame memory means having a stored amplitude sample for each spatial point within the displayed video frame, means for comparing each new sample from said source and its corresponding stored sample in said frame memory means and for developing an energizing signal in response to a significant difference between said new sample and said stored sample, means responsive to said energizing signal for replacing said stored sample with said each new sample in said frame memory means, an address generator synchronized with said source for developing an address word for each new sample which indicates the spatial position of its corresponding new sample, a buffer memory having the means to produce an overload signal when it is storing a predetermined number of samples, means responsive to the replacement of said stored sample for coupling said each new sample and its corresponding address word into said buffer memory, and means responsive to said overload signal for inhibiting the development of said energizing signal for an interval at least as long as the duration of one video frame.

9 The combination as defined in claim 7 wherein said address generator develops a pulse at the start of said displayed video frame, and said means for inhibiting the development of said energizing signal includes a first and second flip-flop each having a set and a cleared state, means for setting said first flip-flop in response to said overload signal and clearing it in response to the pulse from said address generator, means for setting said second flip-flop in response to a cleared state in said first flip-flop and clearing said second flip-flop in response to the pulse from said address generator, and means for developing said energizing signal in response to either of said first or second flip-flops being in its set state.

10. The combination as defined in claim 8 wherein the combination further includes means responsive to inhibiting the development of said energizing signal for developing a blanking waveform having energizing levels at intervals corresponding to predetermined spatial areas in said video frame and having a duration equal to a plurality of video frames, means responsive to the energizing levels in said blanking waveform for blocking said new samples from being coupled to said means for comparing, and means for prohibiting the coupling of said each new sample and its corresponding address word into said buffer memory in response to the energizing levels in said blanking waveform.

11. The combination as defined in claim 10 wherein said buffer memory includes means for generating an empty signal when said buffer memory is storing less than a second predetermined number of samples, and said means for developing said blanking waveform terminates said blanking waveform in response to said empty signal.

12. A conditional replenishment video system for use with video signal samples each one of which represents a video amplitude at a specific spatial point in a video frame, a frame memory means for storing an entire frame of video samples, means for comparing each sample of said video signal samples with a corresponding stored sample in said frame memory means having the same spatial point location in said video frame, means for generating an energizing signal in response to a significant difference in amplitude between said each sample and said stored sample from the frame memory means, an address generator synchronized with said video samples for providing an address digital word for said each sample whose value represents the spatial location of its corresponding video sample, a buffer memory having the means for generating an overload signal when the number of words in storage equals a predetermined number, means responsive to said energizing signal for coupling said each sample and its corresponding address digital word into said buffer memory, means responsive to said overload signal for generating a blanking waveform having energizing levels during intervals that correspond to predetermined spatial points in said video frame, means responsive to said blanking waveform for blocking the video samples from said predetermined spatial points from being coupled to said comparison means, said means for blocking being responsive to said energizing levels for providing a predetermined video signal level to said means for comparing, means for inhibiting the coupling of an amplitude sample and its corresponding address digital word into said buffer memory in response to said blanking waveform, and means responsive to said overload signal for coupling a code word into said buffer memory, said code word providing an indication that said means for blocking is operating in response to said blanking waveform.

13. A conditional replenishment video system as defined in claim 12 wherein said means responsive to said overload signal includes a means for inhibiting the generation of said energizing signal for a predetermined interval equal at least to the duration of one video frame after the generation of said overload signal.

14. A conditional replenishment video system as defined in claim 13 wherein said means for generating a blanking waveform includes a means for indicating the presence of said blanking waveform.

15 A conditional replenishment video receiving apparatus for processing amplitude and address words received from a transmitting location comprising a buffer memory means for storing said amplitude and address words, a frame memory means for storing an entire video frame of amplitude samples, an address generator for providing digital words at its output which indicate by their values specific spatial points within a video frame, said address generator being synchronized with the amplitude samples provided at the output of said frame memory means, means for comparing each digital word developed by said address generator with an address word stored in said buffer memory means and for generating an energizing signal in response to an indication that said each address word and said digital word represent an identical spatial point in the video frame, means responsive to said energizing signal for shifting said address word and an amplitude word out of said buffer memory means, a video display device, blanking switch means for normally coupling amplitude words shifted out of said buffer memory means to said video display device and into said frame memory means, means responsive to said address generator for generating a blanking waveform which has energizing levels at predetermined spatial points within said video frame, and means responsive to the detection of a unique code word at the output of said buffer memory means for coupling said blanking waveform to a control input of said blanking switch, said blanking switch being responsive to said blanking waveform so as to block the amplitude words from being coupled to said video display device and into said frame memory means and instead provide to said video display device and to said frame memory means a constant video amplitude for each of the samples at said predetermined spatial points.

16. Redundancy reduction apparatus for transmitting samples from a locally generated video signal and for processing received samples from a remotely generated video signal, both video signals having time intervals called frame intervals, said apparatus comprising coder means for selecting samples from said locally generated video signal which samples are to be coupled to a remote receiving station, said coder means including a means for generating a blanking waveform having energy levels at intervals corresponding to predetermined spatial points in a frame interval, said blanking waveform being generated by said coder means only in response to an overload condition in said coder means, a blanking switch means responsive to said blanking waveform for blocking samples from the locally generated video signal which correspond to said predetermined spatial points from being coupled into said coder means, a decoder means for assembling the samples from the remotely generated video signal into a continuous stream of video signal amplitude samples; a video display means for converting video signal amplitude samples into a video frame display, a second blanking switch means for normally coupling the continuous stream of video samples from said decoder means to said video display means, said second blanking switch means having a control input which when energized blocks the video signal samples from said decoder means and provides instead a constant video signal amplitude to said video display means, means for generating a second blanking waveform which has energizing levels at intervals corresponding to predetermined spatial areas in said video frame display, and means responsive to the generation of said blanking waveform in said coder means for gating said second blanking waveform to the control input of said second blanking switch means.

17. Redundancy reduction apparatus for use with a video signal having time intervals called frame intervals, said apparatus comprising a source of samples of said video signal each one of which represents the amplitude of said video signal at a specific point in said frame interval, means for selecting samples to be transmitted to a receiving location, means for coupling the samples from said source to said means for selecting samples, a buffer memory for storing said selected samples prior to their transmission to the receiving location, means for coupling the selected samples into said buffer memory, characterized in that said buffer memory generates an overload signal in response to storing a predetermined number of selected samples, and means responsive to said overload signal for inhibiting the selection of all samples by said selecting means for a duration of time equal at least to a frame interval, wherein said means for coupling the selected samples into said buffer memory includes a means for blocking samples from being coupled into said buffer memory which correspond to predetermined spatial points within each of said frame intervals in response to inhibiting the selection of all samples, and wherein said means for blocking samples includes means for visually indicating that samples are being blocked from said buffer memory.

* * * * *